G. H. BENZON, Jr.
FEED MECHANISM FOR METAL PLANING MACHINES AND THE LIKE.
APPLICATION FILED JUNE 26, 1907.
911,566.
Patented Feb. 9, 1909.
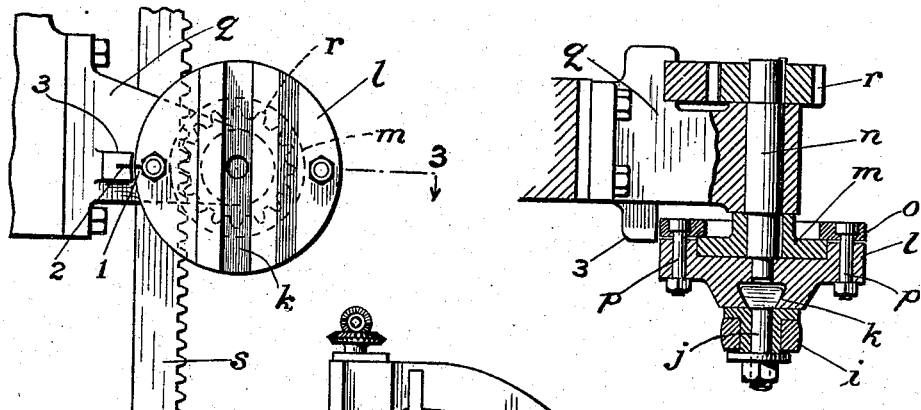
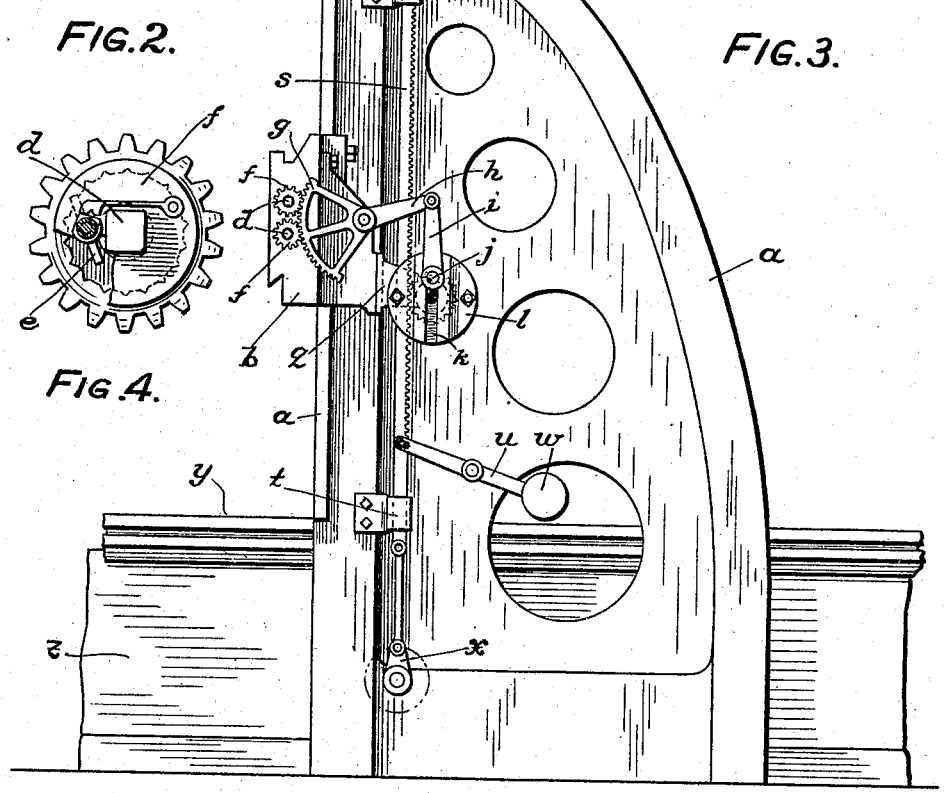
FIG. 2.   FIG. 3.   FIG. 4.   FIG. 1.
WITNESSES:    INVENTOR
              George H. Benzon Jr.
              BY
              ATTORNEYS.

UNITED STATES PATENT OFFICE.

GEORGE H. BENZON, JR., OF PHILADELPHIA, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

FEED MECHANISM FOR METAL-PLANING MACHINES AND THE LIKE.

No. 911,566.          Specification of Letters Patent.          Patented Feb. 9, 1909.

Application filed June 26, 1907. Serial No. 380,842.

*To all whom it may concern:*

Be it known that I, GEORGE H. BENZON, Jr., a citizen of the United States, residing at Philadelphia, county of Philadelphia, and State of Pennsylvania, have invented a new and useful Improvement in Feed Mechanism for Metal-Planing Machines and the Like, of which the following is a full, clear, and exact description, reference being had to the accompanying drawings, which form a part of this specification.

My invention has for its object to provide a feed motion for the tool head of a machine having a reciprocating motion and an intermittent feed, such, for instance, as a metal planing machine, so arranged that the amount of feed may be adjusted at a point conveniently near the tool head, in the case of a planing machine at the end of the cross rail. I accomplish this by means of a rack. I accomplish this in the following manner: The movable tool head is carried by an adjustable slide. I provide a reciprocating rack having a movement of constant amplitude, acting to rotate a crank disk carried by said slide, and which crank disk is capable of being adjusted to have a throw corresponding to the desired movement of the tool head by means of a crank pin adjusted thereon. This crank pin is connected to the usual feed screw or feed rod by which a rotary movement of any desired amount or in any desired direction is imparted to the feed screw or feed rod and thus to the tool head and tool. This and the details of construction hereinafter described form my invention.

I will first describe the embodiment of my invention as illustrated in the accompanying drawings and then point out the invention in the claims.

In the drawings my invention is shown as embodied in a metal planing machine.

In the drawings; Figure 1 is a side view of a machine embodying my invention. Fig. 2 is a detail view showing slotted crank disk. Fig. 3 is a detail section of same on line 3—3, Fig. 2. Fig. 4 is an enlarged view of one of the ratchet boxes broken away to show pawl.

$a$ is one of the housings, $b$ the cross rail which is mounted in the usual manner, so as to move vertically upon the cross heads. $c$ the tool head mounted upon the feed screws or rods $d$, carried by the cross rail $b$, so that by turning the rods, the tool head will be moved and the feed adjusted. These rods or screws are rotated by means of pawls $e$, in the ratchet boxes $f$, which pawls act, in either direction to rotate the feed screws or rods, in one direction by driving and, in the other direction, by taking up. These ratchet boxes $f$ are engaged by a segmental gear $g$ mounted on the end of lever $h$, pivoted to the cross rail. This lever $h$ is coupled, by a connecting rod $i$, with the crank pin $j$, adjustable in a slot $k$, in the crank disk $l$. This crank disk $l$ is carried by a flange $m$, keyed to one end of shaft $n$. The crank disk $l$ is made separate from flange $m$ and secured to it by clamps $o$ drawn up by bolts $p$. The shaft $n$ is carried by a stand $q$ on the rear of the cross rail. On the end of the shaft $n$, opposite to that of the flange $m$, is the pinion $r$ engaging with the rack bar $s$. This rack bar $s$ is carried in guides $t$ on the housing $a$ and counter-balanced by the lever $u$ and weight $w$. This rack bar is moved up or down by a crank $x$. This crank $x$ may be operated, by any well known mechanism, at each reversal of the table $y$, which moves back and forth, in the well known manner, upon the bed $z$.

The throw of the rack bar $s$ is of such extent as to produce not over one-half of a revolution of the pinion $r$, which pinion $r$, through the mechanism described, will rotate the feed screw or rod and thus move the tool head. By adjusting the crank pin $j$ in the slot $k$ the extent of movement of the feed screws or rods may be varied and the desired amount of feed obtained.

In raising or lowering the cross rail, the position of the crank slot, which controls the throw of the segmental gear, may be changed so as to require readjustment in the new position of the cross rail. I accomplish this readjustment in the following manner: When the cross rail is secured in the new position, the bolts $p$ are released and the crank disk rotated until the slot is vertical or until a mark 1 on the crank disk is brought opposite a corresponding mark 2, which is carried on a projection 3 from the stand $q$. The bolts $p$ are then secured and the crank pin $j$ is moved in the slot $k$ to the proper point for the desired throw or movement of segmental gear $g$. The feed will take place at the end or beginning of a working stroke, dependent upon whether the crank pin $j$ is set, at starting above or below the center of the shaft $n$.

Having now fully described my invention, what I claim and desire to protect by Letters Patent is:

1. In machines of the character described, a movable tool head carried upon an adjustable slide, a reciprocating rack having a movement of constant amplitude, a crank disk carried by said slide, a crank pin adjustable thereon, means to rotate said crank disk from the said rack, a connection between said crank pin and said tool head; whereby, in the movement of said crank disk said tool head is moved on the slide and the extent of said movement may be varied.

2. In machines of the character described, in combination a movable tool head carried upon an adjustable slide, a reciprocating rack, a shaft, a crank disk carried upon said slide and mounted so as to be rotatable on the axis of said shaft, means to secure said crank disk to move with said shaft, a crank pin adjustable upon said crank disk, means to drive said shaft and connection between said crank pin and said tool head.

In testimony of which invention, I have hereunto set my hand, at Philadelphia, on this 21st day of June, 1907.

GEORGE H. BENZON, Jr.

Witnesses:
M. M. HAMILTON,
A. M. URIAN.